United States Patent
Wang (10) Patent No.: US 11,445,243 B2
(45) Date of Patent: Sep. 13, 2022

(54) ADAPTIVE RATE CONTROL ADJUSTMENT FOR HARDWARE ENCODER

(71) Applicant: Plantronics, Inc., Santa Cruz, CA (US)

(72) Inventor: Jian Wang, Burnaby (CA)

(73) Assignee: PLANTRONICS, INC., Santa Cruz, CA (US)

( * ) Notice: Subject to any disclaimer, the term of this patent is extended or adjusted under 35 U.S.C. 154(b) by 0 days.

(21) Appl. No.: 16/869,835

(22) Filed: May 8, 2020

(65) Prior Publication Data
US 2020/0359087 A1  Nov. 12, 2020

Related U.S. Application Data (60) Provisional application No. 62/846,501, filed on May 10, 2019.

(51) Int. Cl.
| | |
|---|---|
| *G06F 13/00* | (2006.01) |
| *H04N 21/44* | (2011.01) |
| *H04N 21/43* | (2011.01) |
| *H04N 21/234* | (2011.01) |
| *H04N 21/238* | (2011.01) |

(52) U.S. Cl.
CPC . *H04N 21/44004* (2013.01); *H04N 21/23406* (2013.01); *H04N 21/23805* (2013.01); *H04N 21/4305* (2013.01)

(58) Field of Classification Search
CPC ......... H04N 21/44004; H04N 21/4305; H04N 21/23406; H04N 21/23805; H04N 7/147; H04N 21/2401

USPC ....... 709/233, 235, 231, 232, 230, 220, 221, 709/224, 223
See application file for complete search history.

(56) References Cited

U.S. PATENT DOCUMENTS

| | | | |
|---|---|---|---|
| 8,135,856 B2 * | 3/2012 | Labonte ............. | H04L 65/4092 709/233 |
| 8,255,559 B2 * | 8/2012 | Labonte ............. | H04N 21/812 709/231 |
| 10,659,847 B2 * | 5/2020 | Fu .................... | H04N 21/64769 |

(Continued)

OTHER PUBLICATIONS

"Video buffering verifier," Wikipedia, https://web.archive.org/web/20190601024217/en.wikipedia.org/wiki/video_buffering_verifier, Jun. 1, 2019.

(Continued)

*Primary Examiner* — Kenneth R Coulter (57) ABSTRACT

Correcting encode bit rate errors developed by a hardware encoder with an outer software rate adjustment loop. The rate adjustment loop maintains a VBV (video buffering verifier) buffer model. When VBV buffer fullness is over a threshold, the rate adjustment loop drops frames. If below the threshold, periodically a rate adjustment analysis performed. If a number of frames above a threshold have been dropped, the hardware encoder bit rate is decreased. A leaky bucket is checked to determine in bits and out bits. If the number of in bits exceeds the number of out bits times a multiplier, the hardware encoder bit rate is decreased. If the number of in bits times a multiplier is less than the number of out bits, the hardware encoder bit rate is increased. Dropping frames on buffer condition provides shorter term correction and adjustment of the hardware encoder bit rate provides longer term correction.

20 Claims, 4 Drawing Sheets

(56) References Cited

U.S. PATENT DOCUMENTS

| | | | |
|---|---|---|---|
| 2010/0226444 A1* | 9/2010 | Thevathasan | H04N 21/2187 |
| | | | 375/240.29 |
| 2011/0047283 A1* | 2/2011 | Labonte | H04L 47/30 |
| | | | 709/231 |
| 2012/0173676 A1* | 7/2012 | Labonte | H04L 65/4092 |
| | | | 709/219 |
| 2017/0347158 A1* | 11/2017 | Fu | H04N 21/64769 |

OTHER PUBLICATIONS

"VBV—Video Buffering Verifier," https://web.archive.org/web/20190624032551/www.bretl.com/mpeghtml/VBV.HTM, Jun. 24, 2019.

\* cited by examiner

ADAPTIVE RATE CONTROL ADJUSTMENT FOR HARDWARE ENCODER

CROSS-REFERENCE TO RELATED APPLICATIONS

This application claims priority from U.S. Provisional Application No. 62/846,501, filed on May 10, 2019, which is hereby incorporated by reference.

TECHNICAL FIELD

This disclosure relates to video processing and audio processing, and more particularly to dynamically adjusting the bit-rate for a hardware encoder.

BACKGROUND

When a video compression protocol is new, the compression and decompression operations are performed in software using a digital signal processor (DSP) or general-purpose processor. This software approach allows the new protocol to be commercialized earlier, closer to the release of the compression protocol. However, this is actually an expensive approach as it is likely that a more powerful, and thus costly, DSP must be used to provide the needed calculation bandwidth of the new video compression protocol in addition to the needed bandwidth for the remaining functions. As new products are expected to have a higher price, the cost of being leading edge, this higher cost can be absorbed and profit margins retained. However, over time it is expected that prices will decrease, but cost may not decrease as fast because of the fixed cost of the more powerful DSP.

When the video compression protocol is sufficiently mature, hardware encoders/decoders become available. Hardware development time has passed and now high performance, dedicated or shared function hardware is available at a lower cost than the DSP cost increase needed to perform the compression protocol in software. As this time passage also typically engenders a lower sales price, shifting to the hardware encoder/decoder allows a price reduction while maintaining profit margins at desirable levels.

A hardware encoder is a very complicated device and making all of the desired registers accessible to allow tuning of all of the various parameters becomes difficult, so in some instances the hardware encoder may not correctly handle operations. One such circumstance is bit-rate. Sometimes the bit-rate for a hardware encoder of a conferencing endpoint might not meet a desired bit-rate. As the hardware encoder is essentially a black box with limited control options, this presents a problem to be solved.

SUMMARY

To correct encode bit rate errors developed by a hardware encoder, an outer software rate adjustment loop is provided. The rate adjustment loop maintains a VBV (video buffering verifier) buffer model. When the VBV buffer fullness is over a threshold, the rate adjustment loop drops frames. If below the threshold, periodically a rate adjustment analysis is performed. If a number of frames above a threshold have been dropped, the hardware encoder bit rate is decreased. A leaky bucket is checked to determine in bits and out bits. If the number of in bits exceeds the number of out bits times a multiplier, the hardware encoder bit rate is decreased. If the number of in bits times a multiplier is less than the number of out bits, the hardware encoder bit rate is increased. Dropping frames on buffer condition provides shorter term correction and adjustment of the hardware encoder bit rate provides longer term correction. Using these techniques, the rate adjustment loop addresses the inaccuracy of hardware encoder rate control and better achieves the target bit-rate over time.

BRIEF DESCRIPTION OF THE DRAWINGS

For the purpose of illustration, there are shown in the drawings certain examples described in the present disclosure. In the drawings, like numerals indicate like elements throughout. It should be understood that the full scope of the inventions disclosed herein are not limited to the precise arrangements, dimensions, and instruments shown. In the drawings.

DETAILED DESCRIPTION

In the drawings and the description of the drawings herein, certain terminology is used for convenience only and is not to be taken as limiting the examples of the present disclosure. In the drawings and the description below, like numerals indicate like elements throughout.

Figure 1:
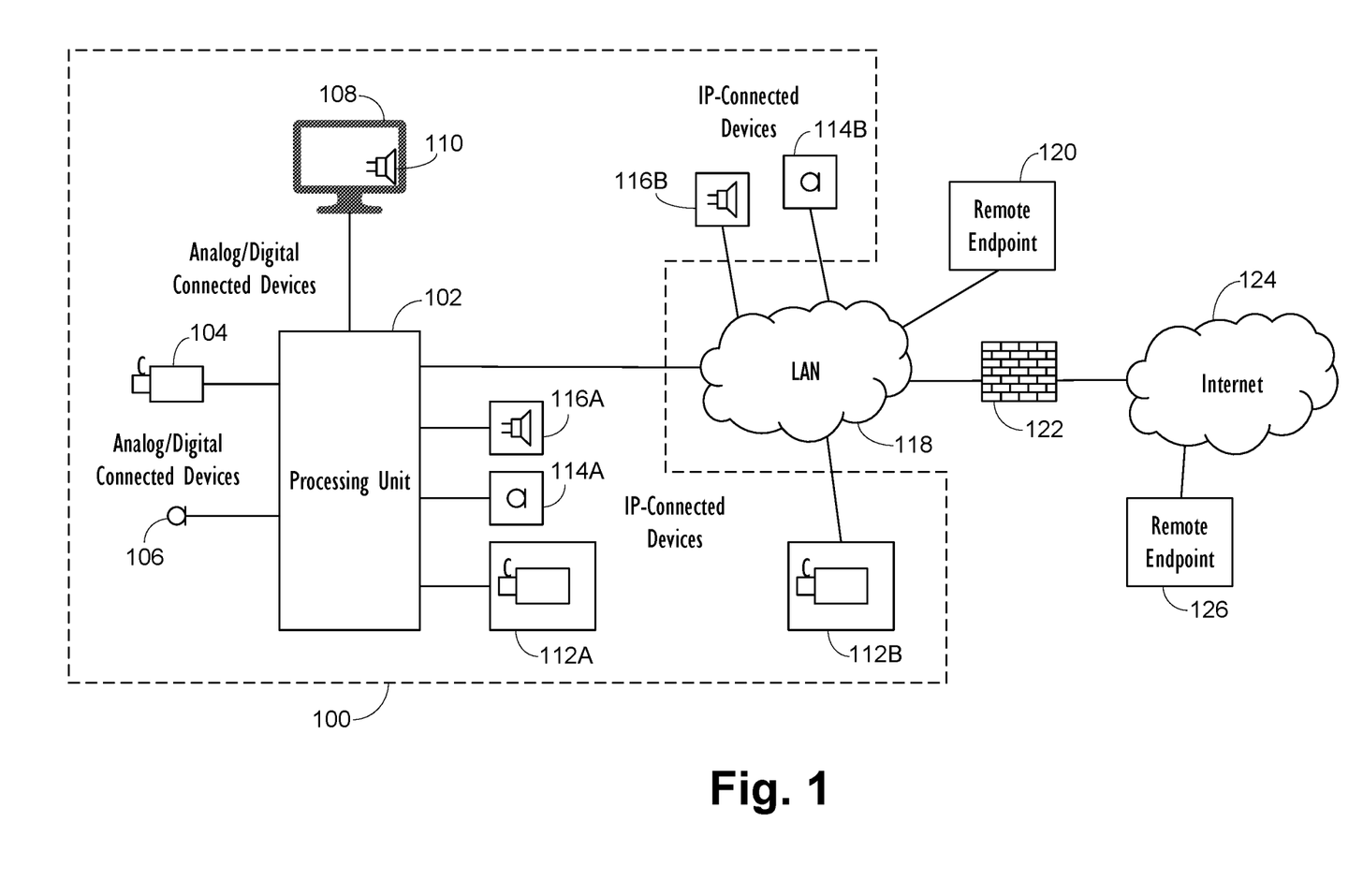
FIG. 1 is a block diagram of an IP-connected conferencing endpoint in accordance with an example of this disclosure.

FIG. 1 illustrates an exemplary video endpoint 100 according to the present invention. A processing unit 102, often referred to as a codec, performs the necessary processing. Local analog and digital connected cameras 104 and microphones 106 are connected directly to the processing unit 102 in a manner similar to the prior art. A television or monitor 108, including a speaker no, is also connected to the processing unit 102 to provide local video and audio output. Additional monitors can be used if desired to provide greater flexibility in displaying conference participants and conference content.

In addition to the local analog and digital connected cameras 104 and microphones 106, the video endpoint 100 of FIG. 1 includes the capability of operating with cameras 112A, 112B, microphones 114A, 114B and speakers 116A, 116B that are connected using an Internet Protocol (IP) Ethernet connection, rather than the prior art analog and digital connections. The IP-connected devices can be locally connected or can be connected to a corporate or other local area network (LAN) 118. A remote endpoint 120 can be located on the LAN 118. The LAN 118 is connected to a firewall 122 and then the Internet 124 in a common configuration to allow communication with a remote endpoint 126. Both the LAN-connected remote endpoint 120 and the Internet-connected remote endpoint 124 are considered far end endpoints and receive encoded video and audio transmitted from the video endpoint 100 and provide encoded video and audio transmitted to the video endpoint 100.

Figure 2:
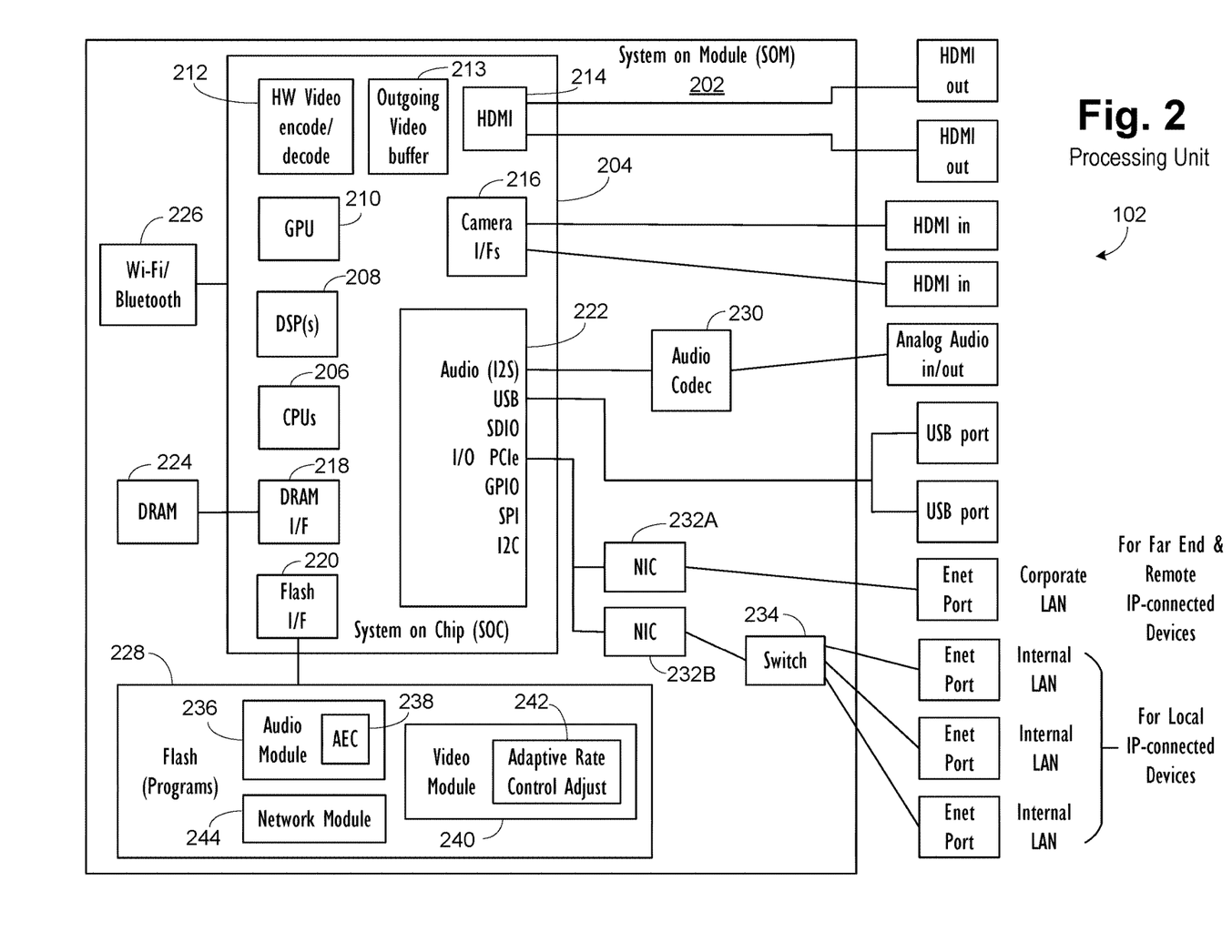
FIG. 2 is a block diagram of a processing unit of FIG. 1 in accordance with an example of this disclosure.

Details of the processing unit 102 of FIG. 1 are shown in FIG. 2. In the illustrated example a system on module (SOM) 202 is the primary component of the processing unit 102. The SOM 202 is often developed using a system on a chip (SOC) 204, such as an SOC used for cellular telephones and handheld equipment, such as a Tegra® X1 from Nvidia® or Qualcomm® 835. The SOC 204 contains CPUs 206, DSP(s) 208, a GPU 210, a hardware video encode and decode module 212, an HDMI output module 214, a camera inputs module 216, a DRAM interface 218, a flash memory interface 220 and an I/O module 222. The I/O module 222 provides audio inputs and outputs, such as I2S signals; USB interfaces, an SDIO interface, PCIe interfaces, an SPI interface, an I2C interface and various general purpose I/O pins (GPIO). DRAM 224 and a Wi-Fi/Bluetooth module 226 are provided on the SOM 202 and connected to the SOC 204 to provide the needed bulk operating memory (RAM associated with each CPU and DSP is not shown, as is RAM generally present on the SOC itself) and additional I/O capabilities commonly used today. An outgoing video buffer 213 maintained as a VBV (video buffering verifier) buffer model receives the encoded frames output by the hardware video encode and decode module 212 and provides encoded frames to be transmitted out the processing unit 102 to a remote endpoint 120, 126.

Flash memory 228, a non-transitory memory, is connected to the SOC 204 to hold the program instructions that are executed by the CPUs and DSPs to provide the endpoint functionality. The flash memory 228 contains software modules such as an audio module 236, which itself includes an automatic echo canceller module 238; a video module 240, which itself includes an adaptive rate control adjustment module 242; and a network module 244. The audio module 236 contains programs for other audio functions, such as various audio codecs, beamforming, and the like. The video module 240 contains programs for other video functions, such as any video codecs not contained in the hardware video encode and decode module 212 and layout control. The network module 244 contains programs to allow communication over the various networks, such as the LAN 118, a Wi-Fi® network or a Bluetooth® network or link.

An audio codec 230 is connected to the SOM 202 to provide local analog line level capabilities. In at least one example of this disclosure, two network interface chips (NICs) 232A, 232B, such as Intel® I210 or other chip compliant with the IEEE 1588 PTP are included. In the example illustrated in FIG. 2, one NIC 232A is for connection to the corporate LAN, while an Ethernet switch 234 is connected to the other NIC 232B to allow for local connection of IP-connected devices.

It is understood that this is an exemplary configuration of the processing unit 102 and video endpoint 100 and many other configurations are possible and can operate according to the present invention.

In a simplified description, video frames are received by the camera inputs module 216 and provided to the DSPs 208 and/or CPUs 206 for processing, such as high dynamic range (HDR) composition, various filtering steps and the like. When the processing is complete, the frames are provided to the adaptive rate control adjustment module 242 executing on the DSPs 208 and/or CPUs 206 for rate control operations. If a frame is to be encoded, it is then provided to the hardware video encode and decode module 212 and encoded. The encoded frame is stored in the outgoing video buffer 213 as part of the VBV operation. Encoded frames are provided from the outgoing video buffer 213 to the DSPs 208 and/or CPUs 206 for inclusion in an Ethernet packet transmitted by the NIC 232A for reception by the remote endpoints 120, 126.

The adaptive rate control adjustment module 242 is configured to adaptively adjust the bit-rate of the encoder function of the hardware video encode and decode module 212 with regard to a target (send) bit-rate for the conferencing video endpoint 100 and to drop frames to maintain the desired bit-rate as between adjustments of the hardware video encode and decode module 212.

Figure 3:
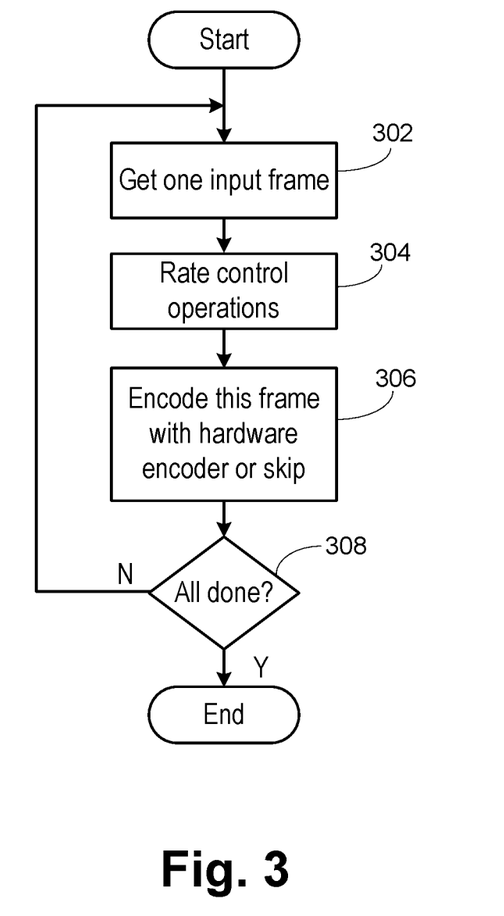
FIG. 3 illustrates a high-level view of a method of operation for an adaptive rate controller of a conferencing endpoint in accordance with an example of this disclosure.
Figure 4:
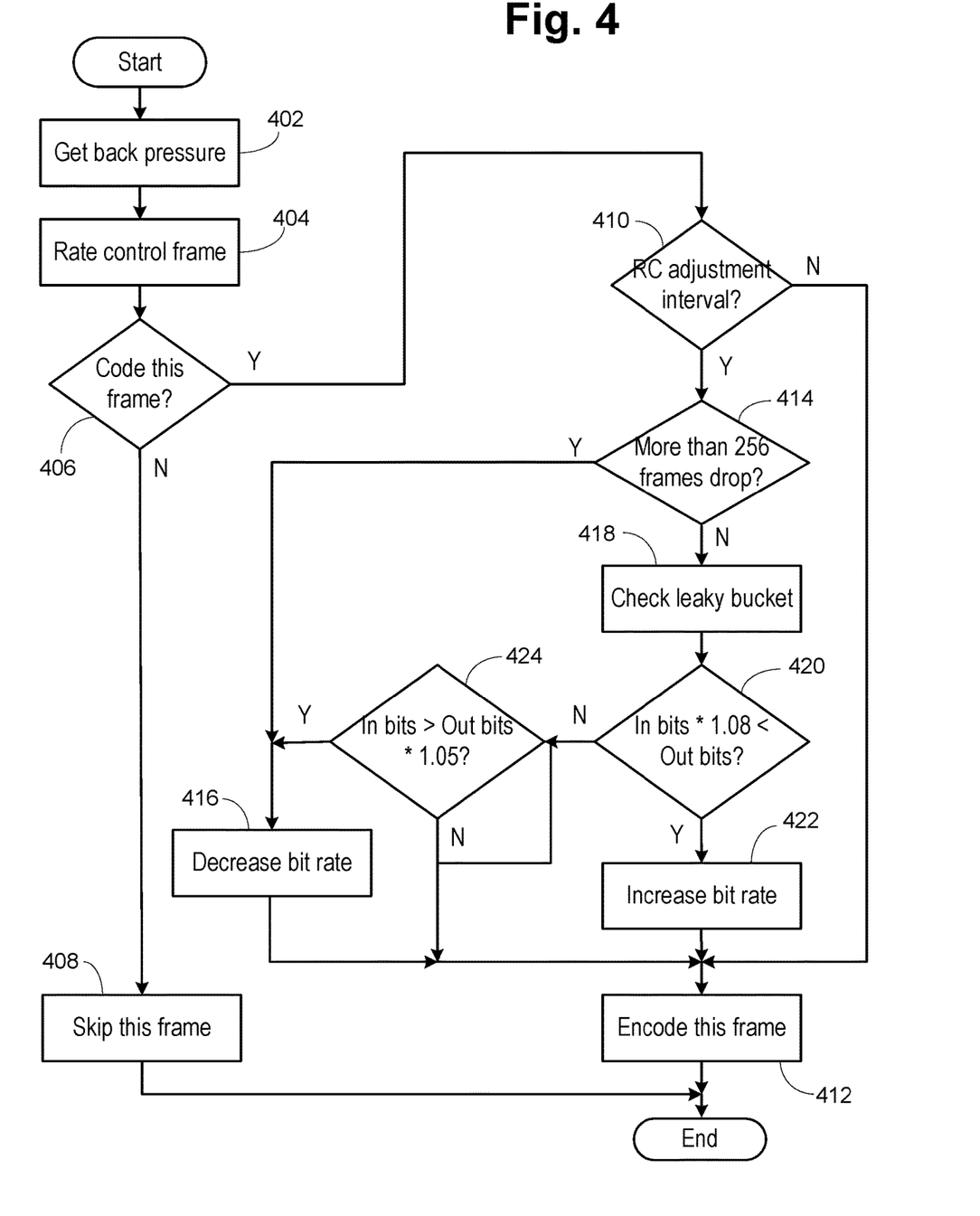
FIG. 4 illustrates a detailed view of the rate control step of the method of FIG. 3.

FIG. 3 illustrates a high-level flowchart of the operation of the adaptive rate control adjustment module 242 in accordance with an example of this disclosure. FIG. 4 illustrates a detailed flowchart of the operation of the adaptive rate control adjustment module 242 in accordance with an example of this disclosure.

Turning to FIG. 3, in step 302 an input frame is obtained. The adaptive rate control adjustment module 242 is in the image flow path from the camera 104, 112A, 112B to the NIC 232A. As a result, each individual input frame is analyzed. In step 304, rate control operations are performed on the input frame. These are explained in more detail in the description of FIG. 4, but include determining if the encode bit-rate of the hardware video encode and decode module 212 should be changed or an input frame should be encoded or skipped. The output of the rate control operation is an indication to encode the input frame using the hardware video encode and decode module 212 or skip or drop the input frame. Step 306 performs the encode frame or skip frame operation. Step 308 determines if all input frames have been analyzed. If not, operation returns to step 302 to get the next input frame.

FIG. 4 provides details of the rate control operations of step 304. In the first step, step 402, back pressure is determined. As described above, the processing unit 102 includes an output video buffer operated as a VBV containing the encoded video frames to be sent to the LAN 118. As a VBV, the buffer is maintained using a leaky bucket model. Step 402 determines the fullness level of the buffer. Step 404 compares the buffer fullness level value with a threshold value. If the buffer fullness level value is above the threshold value, a skip flag is set so that the input frame is not encoded, which would just further fill the already full buffer. If the buffer fullness level value is below the threshold, an encode flag is set. Step 406 checks the skip and encode flags set in step 404. If the skip flag is set, operation proceeds to step 408, where a skipped frame counter is incremented and a skip output value is set and then the rate control operation ends.

If step 406 detects the encode flag being set, operation proceeds to step 410. Step 410 determines if it is time for a rate control adjustment determination. As rate changes should not be made too frequently, to allow times for changes to settle in, rate control adjustment is only determined periodically. An exemplary period is two seconds, but a sliding window can be used if desired, based on the frequency of bit rate adjustments being performed. If adjustments are occurring more frequently, a smaller period is used, while if adjustments are occurring rarely, a longer period is used. If step 410 determines that it is not time for an adjustment determination, operation proceeds to step 412, where an encode output value is set and then rate control operation ends.

If step 410 determines it is time for an adjustment determination, operation proceeds to step 414 to determine if more than 256 frames have been dropped since the last rate adjustment determination. This is done by checking the skipped frame counter that is incremented in step 408. The skipped frame counter is cleared in this determination of step 414. If more than 256 frames have been skipped, operation proceeds to step 416. In step 416 the application programming interface (API) of the SOC 204 is used to decrease the bit rate value of the hardware video encode and decode module 212 and operation proceeds to step 412.

If less than 256 frames have been dropped, operation proceeds from step 414 to step 418. In step 418 the output video buffer leaky bucket is checked to determine the number of in bits and the number of out bits of the leaky bucket. In bits and out bits are monitored rather than frames in and frames out as the encoding operation provides differing number of bits for each frame, depending on the encoding and the specific content of a given frame and proceeding frames. As the outgoing video buffer 213 has a size which is measured in bits, in bits and out bits are the appropriate measures for the leaky bucket determinations. However, encode or skip decisions are made at the frame level as they are made prior to the frame being encoded. Step 420 uses these numbers of in bits and out bits to determine if the bit rate is too low. The number of in bits is multiplied times a low rate factor, such as 1.08, and compared against the number of out bits. If the multiplied in bits value is less than the number of out bits, in step 422 the SOC 204 API is used to increase the bit rate as the outgoing video buffer 213 is emptying faster, or filling slower, than needed to keep the outgoing video buffer 213 within desired bounds. If the multiplied in bits value is not less than the number of out bits, in step 424 as second determination is made. In step 424 the number of in bits is compared to the number of out bits multiplied by a high rate factor, such as 1.05. If the number of in bits is greater than the multiplied out bits number, operation proceeds to step 416 to decrease the encoding bit rate in step 416 as the outgoing video buffer 213 is filling faster, or emptying slower, than needed to keep the outgoing video buffer 213 within desired bounds. If the number of in bits is not greater than the multiplied out bits number, operation proceeds to step 412 where the output is set to encode the frame.

It is understood that the various threshold and multiplier values, such as the dropped frame count, the in bits multiplier low rate factor, the out bits multiplier high rate factor and the buffer threshold can be set at values other than described herein and may need to be varied to tune particular embodiments.

In this manner the exemplary adaptive rate control adjustment module 242 provides an outer adjustment loop that uses a sliding window or fixed time interval (for example, two seconds) to update the target bit-rate for the hardware video encode and decode module 212 to maintain an outgoing video buffer 213 as a VBV according to a leaky bucket model, comparing incoming bits from coded frames and outgoing bits to the LAN 118. If the difference between incoming bits and outgoing bits for the 'leaky bucket' exceeds a threshold, either higher or lower, the bit-rate of the encoder hardware is adjusted accordingly. For example, when the incoming bit rate is higher than the outgoing bit-rate by a factor, the actual bit-rate is higher than the target bit-rate, and the bit-rate of the hardware video encode and decode module 212 is reduced, while if the incoming bit rate is lower than outgoing bits by a factor, the actual bit-rate is lower than the target bit-rate, and the bit-rate of hardware video encode and decode module 212 is increased. Additionally, if the number of times a frame is dropped because the outgoing video buffer 213 level is over a desired value, the bit-rate of the hardware video encode and decode module 212 is lowered.

In this manner problems with encoding bit rates of hardware video encoders can be corrected when access to the hardware video encoder is limited and the hardware video encoder is not particularly stable in its output bit rate.

The various examples described above are provided by way of illustration only, and should not be construed so as to limit the scope of the disclosure. Various modifications and changes can be made to the principles and examples described herein without departing from the scope of the disclosure and without departing from the claims which follow.

The invention claimed is:

1. An encoded video transmitter comprising:
   a video input;
   an encoded video output;
   a hardware video encoder coupled to the video input and to the encoded video output;
   an outgoing video buffer coupled to the hardware video encoder and to the encoded video output and receiving frames from the hardware video encoder and providing frames to the encoded video output;
   a processor coupled to the hardware video encoder, the video input and the outgoing video buffer; and
   a non-transitory memory coupled to the processor and storing instructions to cause the processor to perform a method comprising the steps of:
   receiving a video frame to be encoded;
   determining a fullness level value of the outgoing video buffer;
   causing encoding of the received video frame to be skipped when the buffer fullness level value is above a threshold; and
   periodically performing video encoding rate operations and adjusting of an encoding bit rate of the hardware video encoder if appropriate.

2. The encoded video transmitter of claim 1, wherein causing encoding of the received video frame to be skipped includes incrementing a counter of skipped frames, and
   wherein performing video encoding rate operations and adjusting of the encoding bit rate of the hardware video encoder includes:
   determining if the value of the skipped frame counter is above a second threshold; and
   decreasing the encoding bit rate of the hardware video encoder when the skipped frame counter value is above the second threshold.

3. The encoded video transmitter of claim 2, wherein performing video encoding rate operations and adjusting of the encoding bit rate of the hardware video encoder includes:
   determining if the bits flowing into the outgoing video buffer are greater than the bits flowing out of the outgoing video buffer multiplied by a high rate factor; and
   decreasing the encoding bit rate of the hardware video encoder when the bits flowing into the outgoing video buffer are greater than the bits flowing out of the outgoing video buffer multiplied by a high rate factor.

4. The encoded video transmitter of claim 3, wherein performing video encoding rate operations and adjusting of the encoding bit rate of the hardware video encoder includes:
   determining if the bits flowing into the outgoing video buffer multiplied by a low rate factor are less than the bits flowing out of the outgoing video buffer; and
   increasing the encoding bit rate of the hardware video encoder when the bits flowing into the outgoing video buffer multiplied by a low rate factor are less than the bits flowing out of the outgoing video buffer.

5. The encoded video transmitter of claim 2, wherein performing video encoding rate operations and adjusting of the encoding bit rate of the hardware video encoder includes:
  determining if the bits flowing into the outgoing video buffer multiplied by a low rate factor are less than the bits flowing out of the outgoing video buffer; and
  increasing the encoding bit rate of the hardware video encoder when the bits flowing into the outgoing video buffer multiplied by a low rate factor are less than the bits flowing out of the outgoing video buffer.

6. The encoded video transmitter of claim 1, wherein performing video encoding rate operations and adjusting of the encoding bit rate of the hardware video encoder includes:
  determining if the bits flowing into the outgoing video buffer multiplied by a low rate factor are less than the bits flowing out of the outgoing video buffer; and
  increasing the encoding bit rate of the hardware video encoder when the bits flowing into the outgoing video buffer multiplied by a low rate factor are less than the bits flowing out of the outgoing video buffer.

7. The encoded video transmitter of claim 6, wherein performing video encoding rate operations and adjusting of the encoding bit rate of the hardware video encoder includes:
  determining if the bits flowing into the outgoing video buffer are greater than the bits flowing out of the outgoing video buffer multiplied by a high rate factor; and
  decreasing the encoding bit rate of the hardware video encoder when the bits flowing into the outgoing video buffer are greater than the bits flowing out of the outgoing video buffer multiplied by a high rate factor.

8. The encoded video transmitter of claim 1, wherein performing video encoding rate operations and adjusting of the encoding bit rate of the hardware video encoder includes:
  determining if the bits flowing into the outgoing video buffer are greater than the bits flowing out of the outgoing video buffer multiplied by a high rate factor; and
  decreasing the encoding bit rate of the hardware video encoder when the bits flowing into the outgoing video buffer are greater than the bits flowing out of the outgoing video buffer multiplied by a high rate factor.

9. A method of transmitting encoded video from an encoded video transmitter using a hardware video encoder, the method comprising:
  receiving a video frame to be encoded;
  determining a fullness level value of an outgoing video buffer;
  causing encoding of the received video frame to be skipped when the buffer fullness level value is above a threshold; and
  periodically performing video encoding rate operations and adjusting of an encoding bit rate of the hardware video encoder if appropriate.

10. The method of claim 9, wherein causing encoding of the received video frame to be skipped includes incrementing a counter of skipped frames, and
  wherein performing video encoding rate operations and adjusting of the encoding bit rate of the hardware video encoder includes:
    determining if the value of the skipped frame counter is above a second threshold; and
    decreasing the encoding bit rate of the hardware video encoder when the skipped frame counter value is above the second threshold.

11. The method of claim 10, wherein performing video encoding rate operations and adjusting of the encoding bit rate of the hardware video encoder includes:
  determining if the bits flowing into the outgoing video buffer are greater than the bits flowing out of the outgoing video buffer multiplied by a high rate factor;
  decreasing the encoding bit rate of the hardware video encoder when the bits flowing into the outgoing video buffer are greater than the bits flowing out of the outgoing video buffer multiplied by a high rate factor;
  determining if the bits flowing into the outgoing video buffer multiplied by a low rate factor are less than the bits flowing out of the outgoing video buffer; and
  increasing the encoding bit rate of the hardware video encoder when the bits flowing into the outgoing video buffer multiplied by a low rate factor are less than the bits flowing out of the outgoing video buffer.

12. The method of claim 9, wherein performing video encoding rate operations and adjusting of the encoding bit rate of the hardware video encoder includes:
  determining if the bits flowing into the outgoing video buffer multiplied by a low rate factor are less than the bits flowing out of the outgoing video buffer; and
  increasing the encoding bit rate of the hardware video encoder when the bits flowing into the outgoing video buffer multiplied by a low rate factor are less than the bits flowing out of the outgoing video buffer.

13. The method of claim 12, wherein performing video encoding rate operations and adjusting of the encoding bit rate of the hardware video encoder includes:
  determining if the bits flowing into the outgoing video buffer are greater than the bits flowing out of the outgoing video buffer multiplied by a high rate factor; and
  decreasing the encoding bit rate of the hardware video encoder when the bits flowing into the outgoing video buffer are greater than the bits flowing out of the outgoing video buffer multiplied by a high rate factor.

14. The method of claim 9, wherein performing video encoding rate operations and adjusting of the encoding bit rate of the hardware video encoder includes:
  determining if the bits flowing into the outgoing video buffer are greater than the bits flowing out of the outgoing video buffer multiplied by a high rate factor; and
  decreasing the encoding bit rate of the hardware video encoder when the bits flowing into the outgoing video buffer are greater than the bits flowing out of the outgoing video buffer multiplied by a high rate factor.

15. A non-transitory memory coupled to a processor and storing instructions to cause the processor to perform a method comprising the steps of:
  receiving a video frame to be encoded;
  determining a fullness level value of an outgoing video buffer;
  causing encoding of the received video frame to be skipped when the buffer fullness level value is above a threshold; and
  periodically performing video encoding rate operations and adjusting of an encoding bit rate of a hardware video encoder if appropriate.

16. The non-transitory memory of claim 15, wherein causing encoding of the received video frame to be skipped includes incrementing a counter of skipped frames, and wherein performing video encoding rate operations and adjusting of the encoding bit rate of the hardware video encoder includes:
determining if the value of the skipped frame counter is above a second threshold; and
decreasing the encoding bit rate of the hardware video encoder when the skipped frame counter value is above the second threshold.

17. The non-transitory memory of claim 16, wherein performing video encoding rate operations and adjusting of the encoding bit rate of the hardware video encoder includes:
determining if the bits flowing into the outgoing video buffer are greater than the bits flowing out of the outgoing video buffer multiplied by a high rate factor;
decreasing the encoding bit rate of the hardware video encoder when the bits flowing into the outgoing video buffer are greater than the bits flowing out of the outgoing video buffer multiplied by a high rate factor;
determining if the bits flowing into the outgoing video buffer multiplied by a low rate factor are less than the bits flowing out of the outgoing video buffer; and
increasing the encoding bit rate of the hardware video encoder when the bits flowing into the outgoing video buffer multiplied by a low rate factor are less than the bits flowing out of the outgoing video buffer.

18. The non-transitory memory of claim 15, wherein performing video encoding rate operations and adjusting of the encoding bit rate of the hardware video encoder includes:
determining if the bits flowing into the outgoing video buffer multiplied by a low rate factor are less than the bits flowing out of the outgoing video buffer; and
increasing the encoding bit rate of the hardware video encoder when the bits flowing into the outgoing video buffer multiplied by a low rate factor are less than the bits flowing out of the outgoing video buffer.

19. The non-transitory memory of claim 18, wherein performing video encoding rate operations and adjusting of the encoding bit rate of the hardware video encoder includes:
determining if the bits flowing into the outgoing video buffer are greater than the bits flowing out of the outgoing video buffer multiplied by a high rate factor; and
decreasing the encoding bit rate of the hardware video encoder when the bits flowing into the outgoing video buffer are greater than the bits flowing out of the outgoing video buffer multiplied by a high rate factor.

20. The non-transitory memory of claim 15, wherein performing video encoding rate operations and adjusting of the encoding bit rate of the hardware video encoder includes:
determining if the bits flowing into the outgoing video buffer are greater than the bits flowing out of the outgoing video buffer multiplied by a high rate factor; and
decreasing the encoding bit rate of the hardware video encoder when the bits flowing into the outgoing video buffer are greater than the bits flowing out of the outgoing video buffer multiplied by a high rate factor.

\* \* \* \* \*